United States Patent
Handing et al.

(10) Patent No.: US 11,772,192 B2
(45) Date of Patent: Oct. 3, 2023

(54) BATTERY CARRIER COMPOSED OF LIGHTWEIGHT METAL PROFILES WITH CALIBRATED ENDS, AND METHOD FOR THE PRODUCTION THEREOF

(71) Applicant: BENTELER AUTOMOBILTECHNIK GMBH, Paderborn (DE)

(72) Inventors: Christian Handing, Langenberg (DE); Frode Paulsen, Gjovik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 188 days.

(21) Appl. No.: 17/382,653

(22) Filed: Jul. 22, 2021

(65) Prior Publication Data
US 2022/0029235 A1    Jan. 27, 2022

(30) Foreign Application Priority Data
Jul. 23, 2020   (DE) ................. 10 2020 119 533.8

(51) Int. Cl.
*B60K 1/04*   (2019.01)
*B23K 26/21*   (2014.01)
(Continued)

(52) U.S. Cl.
CPC ............ *B23K 26/21* (2015.10); *B60L 50/64* (2019.02); *B60L 50/66* (2019.02);
(Continued)

(58) Field of Classification Search
CPC ............ H01M 50/244; H01M 50/249; H01M 2220/20; H01M 50/224; B62D 29/00
See application file for complete search history.

(56) References Cited

U.S. PATENT DOCUMENTS 5,875,085 A * 2/1999 Farley .................. H02J 7/0014
361/84
6,085,854 A    7/2000 Nishikawa
(Continued)

FOREIGN PATENT DOCUMENTS

DE   102012223801 A1   6/2014
DE   102016115647 B3   12/2017
(Continued)

OTHER PUBLICATIONS

Office Action for German Application No. 10 2020 119 533.8 dated May 12, 2021; 16pp.
(Continued)

*Primary Examiner* — John D Walters
*Assistant Examiner* — James J Triggs
(74) *Attorney, Agent, or Firm* — HAUPTMAN HAM, LLP

(57) ABSTRACT

A battery carrier for an electric vehicle that has a trough with a frame and/or struts running in the trough. The frame and/or the struts are produced from hollow profiles, such as extruded lightweight metal profiles, which are connected by means of materially bonded joining. At least one lightweight metal profile has been geometrically calibrated at one end portion, which has a chamfer on a top side, wherein the thermal joining seam is arranged in the chamfer.

13 Claims, 9 Drawing Sheets

(51) Int. Cl.
*B60L 50/64* (2019.01)
*B60L 50/60* (2019.01)
*H01M 50/249* (2021.01)
*H01M 50/244* (2021.01)
*B62D 29/00* (2006.01)

(52) U.S. Cl.
CPC ....... *H01M 50/244* (2021.01); *H01M 50/249* (2021.01); *B62D 29/00* (2013.01); *H01M 2220/20* (2013.01)

(56) References Cited

U.S. PATENT DOCUMENTS

| | | | | |
|---|---|---|---|---|
| 8,936,125 | B2* | 1/2015 | Nakamori | H01M 50/249 |
| | | | | 220/651 |
| 9,287,537 | B2* | 3/2016 | Kusunoki | H01G 11/78 |
| 10,096,807 | B2* | 10/2018 | Fister | H01M 50/271 |
| 10,804,711 | B2* | 10/2020 | Sheeks | H01M 50/213 |
| 10,886,513 | B2* | 1/2021 | Stephens | H01M 50/224 |
| 10,985,579 | B2* | 4/2021 | Hohmann | H02H 9/026 |
| 11,002,609 | B2* | 5/2021 | Bass | H01H 37/52 |
| 11,031,649 | B2* | 6/2021 | Hilfrich | H01M 50/244 |
| 11,066,026 | B2* | 7/2021 | Yasunori | H02H 9/02 |
| 11,205,816 | B2* | 12/2021 | Günther | H01M 50/262 |
| 11,362,650 | B2* | 6/2022 | Chin | H03K 17/08122 |
| 2002/0060622 | A1* | 5/2002 | Scott | H01H 37/5427 |
| | | | | 337/381 |
| 2011/0143179 | A1* | 6/2011 | Nakamori | H01M 50/271 |
| | | | | 429/99 |
| 2014/0301525 | A1* | 10/2014 | Reynolds, IV | G07C 3/00 |
| | | | | 377/15 |
| 2015/0171492 | A1* | 6/2015 | Ramsayer | H01M 10/6551 |
| | | | | 429/120 |
| 2017/0179713 | A1* | 6/2017 | Bourns | H02H 9/026 |
| 2020/0006722 | A1* | 1/2020 | Tanner | H01M 10/6556 |
| 2023/0036105 | A1* | 2/2023 | Langworthy | H01M 50/204 |

FOREIGN PATENT DOCUMENTS

| | | |
|---|---|---|
| DE | 102017005401 A1 | 12/2018 |
| DE | 102018120466 A1 | 2/2020 |
| DE | 102018124982 A1 | 4/2020 |

OTHER PUBLICATIONS

Extended European Search Report of European Application No. 21187212 dated Nov. 25, 2021; 17pp.

* cited by examiner

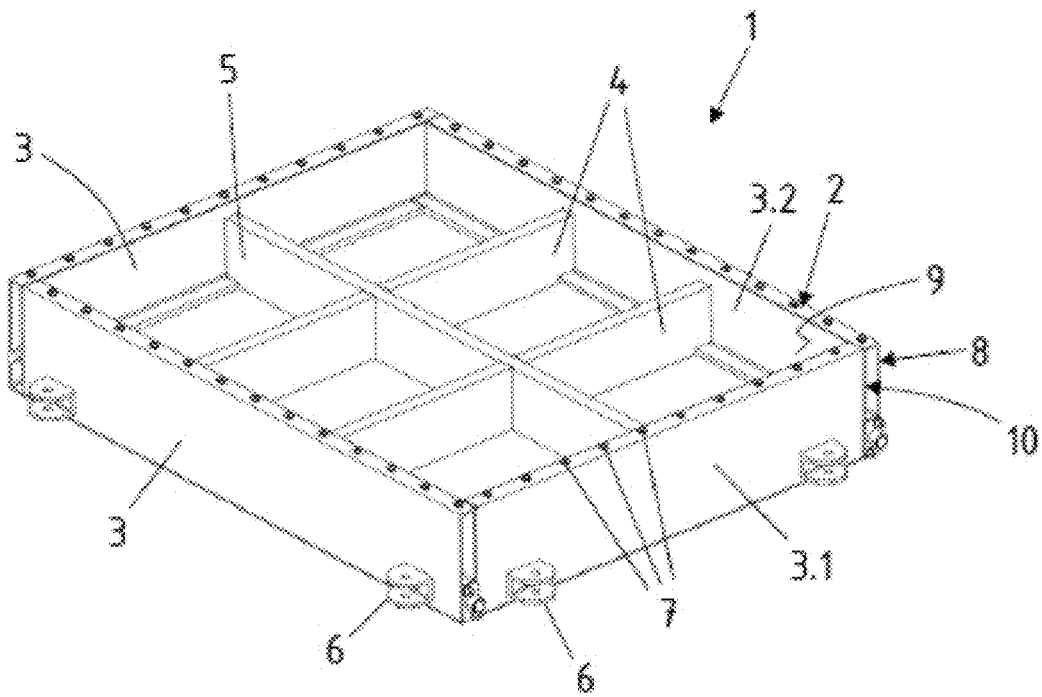
Fig. 1
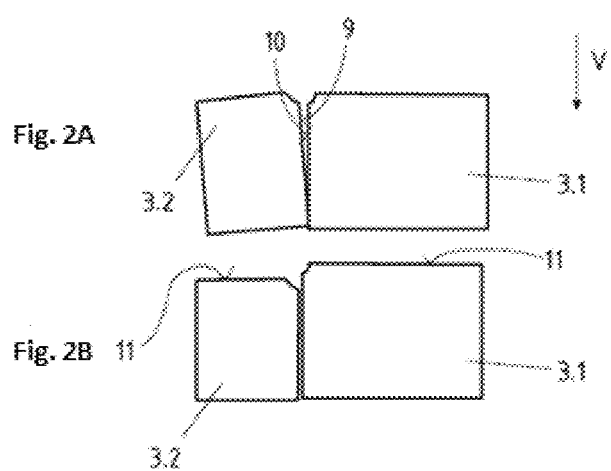
Fig. 2A
Fig. 2B

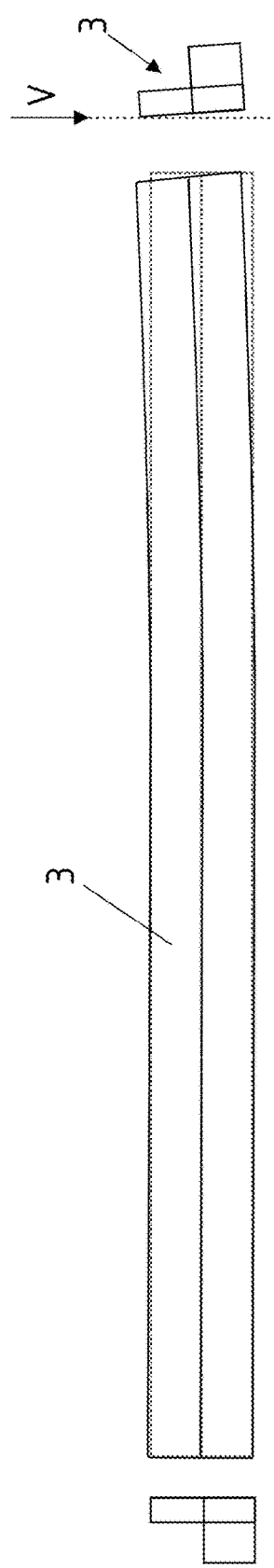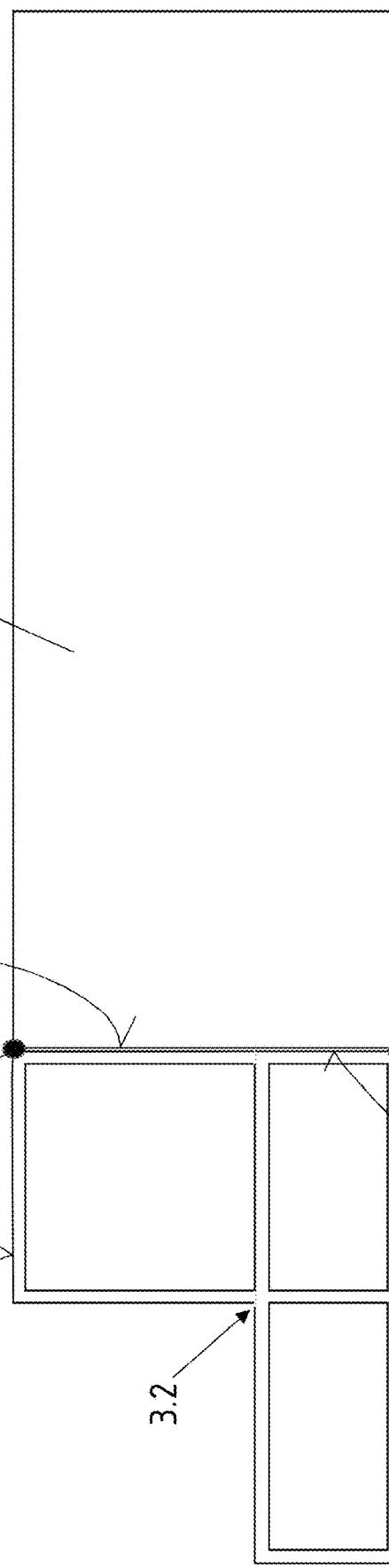

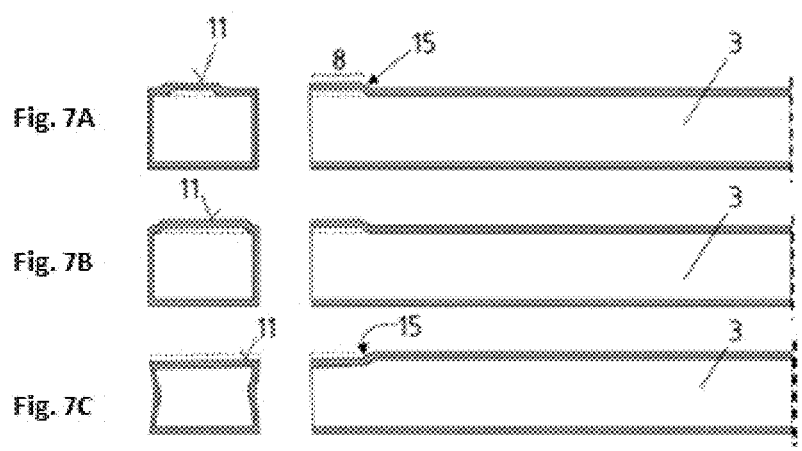

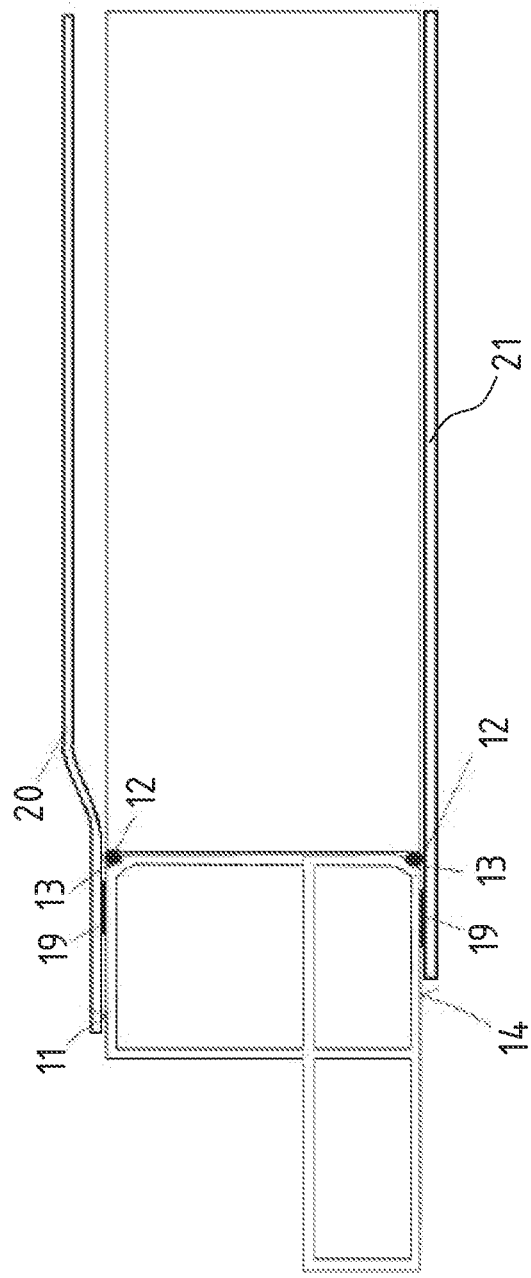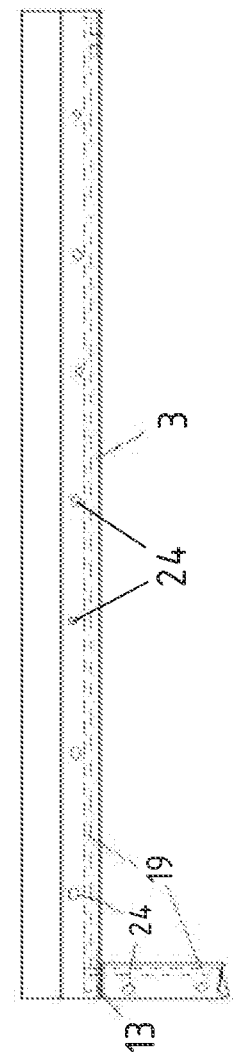

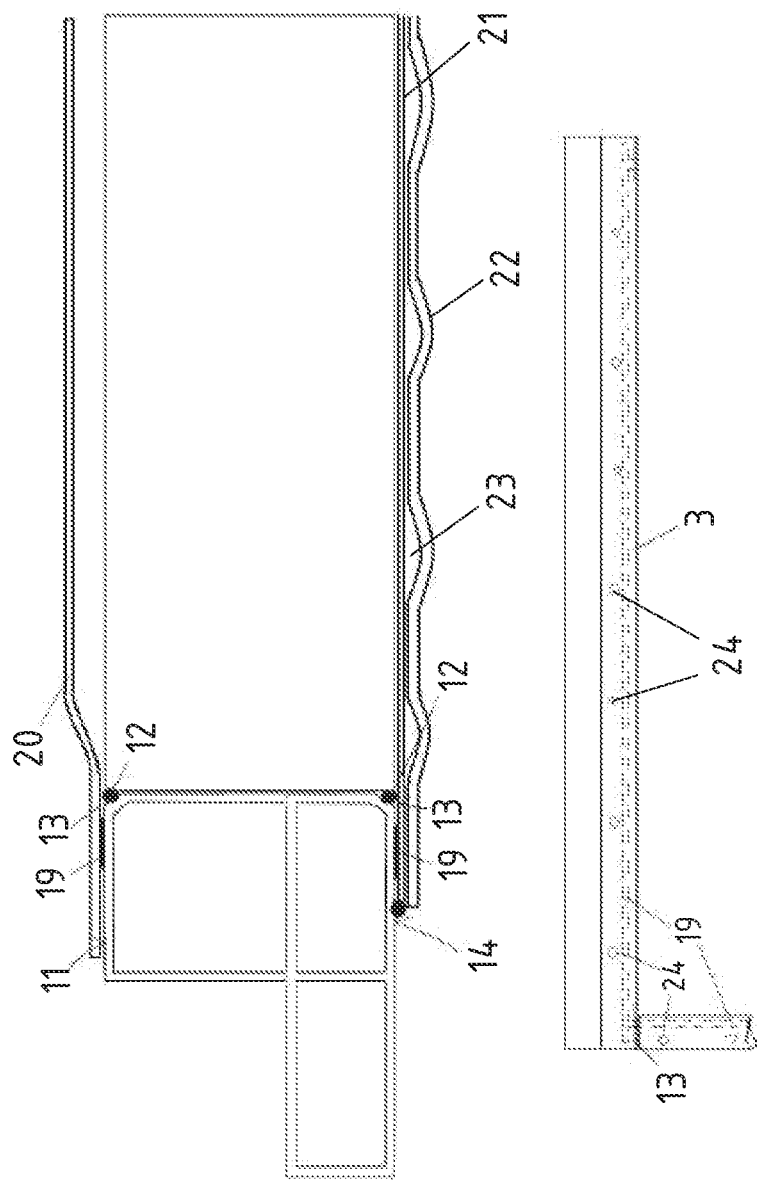

BATTERY CARRIER COMPOSED OF LIGHTWEIGHT METAL PROFILES WITH CALIBRATED ENDS, AND METHOD FOR THE PRODUCTION THEREOF

RELATED APPLICATIONS

The present application claims priority of German Application Number 10 2020 119 533.8 filed Jul. 23, 2020, the disclosure of which is hereby incorporated by reference herein in its entirety.

FIELD

The present disclosure relates to a battery carrier.

The present disclosure furthermore relates to a method for producing a battery carrier.

BACKGROUND

Nowadays, for the purpose of producing battery carriers, profiles of aluminum or steel alloys are used for this as material for the base and walls, which are joined to one another and thus provide an interior space for receiving batteries. The interior space is closed in a fluid-tight manner by a cover and a seal. The base and the walls composed of one or more respective profiles are also connected to one another in a fluid-tight manner, for example by friction stir welding or cold pressure joining.

Because of the large dimensions of the battery carriers of several square meters, during the manufacture the challenge arises that production tolerances of the profiles (wall thicknesses, outer dimensions, etc.) from an extrusion process or in the case of steel material also from the roll-forming process are relatively large, and therefore the coupling to one another is made more difficult.

Cost-intensive machining of the joining regions, such as the frame profiles, is carried out in order to reduce and/or compensate the large tolerances. In this respect, the effect of the required oversize of the profiles is also a higher overall weight, since the wall thickness has to be chosen as higher than is necessary for the structural durability.

As an alternative, before the joining, the profiles are aligned in relation to one another in a clamping device and/or frame gauge and positioned in the joining position and then joined. Introduction of high residual stresses can have an adverse effect on the service life and crash properties of the battery holder.

SUMMARY

An object of the present disclosure is to provide a battery carrier which can be produced cost-effectively, at the same time has high geometric precision, specifically in connection points of individual components, and optionally meets improved sealing properties.

The object stated above is achieved according to the disclosure by a battery carrier.

The battery carrier according to the disclosure can also be referred to as battery tray or battery housing. This is arranged in the underfloor region of an electric vehicle, which may also be referred to below as an electric motor vehicle. The interior space of such a battery carrier is suitable for receiving a large number of batteries, which store electrical energy for the locomotion of the electric vehicle. These batteries may also be referred to as traction batteries. Under certain circumstances, the surface area in plan view of such a battery carrier has a size of more than one or more than two square meters.

The battery carrier is referred to as an assembled battery carrier. This means that the battery carrier is not deep-drawn in one piece from a trough, for example a sheet-metal component, or produced as a plastics component. No, rather the battery carrier has a frame which completely, or at least partially, runs around on the outside. The frame is produced from various hollow profiles. These hollow profiles may be formed from a steel material and have been produced by shaping, or roll forming, for example. However, the battery carrier is formed from lightweight metal profiles. The lightweight metal profiles are produced as extruded profiles, and made of an aluminum alloy. The cross section itself of these lightweight metal profiles may be in the form of a multi-chamber hollow profile. The hollow profiles are therefore referred to as lightweight metal profiles below, but may also be steel profiles.

The disclosure furthermore provides that struts are arranged inside the battery carrier. These may be in the form of transverse or longitudinal struts. These struts serve firstly for stiffening purposes during operation, but specifically also in the event of a crash. The struts are arranged in the battery carrier in the form of transverse struts and/or longitudinal struts. The struts may also serve to subdivide individual receiving spaces for the corresponding vehicle batteries.

The term lightweight metal profile is used below. However, in the context of this disclosure, a profile component which may have been produced from steel also falls under this, and can then be used in substitution without another repetition or differentiation of the terms.

According to the disclosure, at least one lightweight metal profile has been geometrically calibrated in at least one end region.

"Geometrically calibrated" should be understood to mean that a permanent plastic deformation of the lightweight metal profile in the end region was carried out before a later joining operation. What is achieved by this is that the respective end region, which is to be joined to a further component, is precisely arranged in terms of its cross-sectional geometry and its positional tolerance such that the mounting is performed with higher precision. This makes possible for residual stresses in the component itself to be avoided, since a frame gauge, which is used under certain circumstances to join the components, does not place the individual components under additional stress in order to be able to join them, since an improved positional tolerance and tolerance in terms of the cross-sectional geometry are already achieved by the calibration.

According to the disclosure, the calibration is also carried out in such a way that a chamfer is produced on a top side in an end portion. This chamfer may be produced by being pressed in or embossed, therefore by shaping. The chamfer may, however, also be produced by machining as a result of a milling process. During a later thermal joining operation, the joining seam can be at least partially arranged in the chamfer itself. Consequently, the joining seam of two components that are adjacent to one another can be formed in an already recessed manner and requires less and/or negligible reworking if even a sufficiently precise thermal joining process, for example laser welding, is used. If appropriate, the joining seam has only to be reground, but not machined in a complex manner, for example firstly processed by a milling operation.

By virtue of the production of the chamfer and a geometric calibration of the entire end portion of the lightweight metal profile, the quality of the welded connection to be produced is also improved at the same time, since the welded connection can be produced with higher precision and without need to compensate positional tolerances, if appropriate, of the two components to be joined. As a result of the reduced or eliminated removal of a large joining-seam protrusion, the ability of the seam to bear loads is significantly increased overall.

According to the present disclosure, lightweight metal profiles are therefore calibrated at the end regions to be connected and further provided with a chamfer on their top side, but also possibly on further sides, with the result that, during a later thermal joining operation, a higher geometric precision and a better performance of the weld seam can be achieved along with a reduced need for reworking at the same time.

Likewise, with the disclosure, a height offset, for example, of two adjacent lightweight metal profiles in the transition region in the respective end regions can also be compensated.

For this purpose, for example, a top side is embossed, for example raised or pressed down, during the calibration operation, with the result that an even transition is provided on the top side of the frame running around on the outside, for example, in the transition region of two adjacent lightweight metal profiles. The height offset, which becomes ever more evident in the further longitudinal course of the lightweight metal profile as a result of this, however, is seamless and/or runs progressively or degressively. In the region of the abutting edge between two adjacent lightweight metal profiles, however, this height offset would be formed as a step offset, to avoid this by virtue of the calibration operation according to the disclosure.

Consequently, the end region has a cross-sectional geometry which deviates from the rest of the longitudinal course of the lightweight metal profile. This arises from the plastic deformation during the calibration operation.

According to the disclosure, tolerance compensating elements can therefore be dispensed with. There is no need to use a welding frame or a welding gauge in order not only to align the components in relation to one another, but also to still intrinsically brace them, with the result that tolerances would be compensated.

According to the disclosure, calibration of the lightweight metal profiles, such as in the joining regions, can occur by virtue of local plastic deformations, introduced in a targeted manner, in at least one wall portion.

Consequently, the orientation and/or angular position of a side wall with respect to a vertical is different to the orientation of the side wall in a longitudinal portion, adjoining the corner region, of the same lightweight metal profile.

The cross-sectional shape in the end region of the lightweight metal profile is likewise different to the cross-sectional shape of the following longitudinal portion of the same lightweight metal profile.

Around the periphery, the same cross section of the lightweight metal profiles can be used. However, different lightweight metal profiles with cross sections that differ from one another can also be used. For example, the frame profiles can have a cross section which is different to, or larger than, the cross sections of the struts.

The cross sections of two lightweight metal profiles of the frame can differ from one another. For example, on a top a cross-sectional profile with a larger cross section can be used in relation to the lightweight metal profiles of the side walls of the battery carrier.

A further constituent of the disclosure is a method for producing a battery carrier with a frame which at least partially runs around on the outside from lightweight metal profiles which are thermally joined to one another. The battery carrier is produced with the above features.

The method comprises the following steps:
providing lightweight metal profiles,
optionally cutting the lightweight metal profiles to the desired length,
calibrating the ends of at least one lightweight metal profile by plastic shaping,
wherein the chamfer (13) is created during the extrusion, before the calibration of the ends or during the calibration of the ends,
arranging two lightweight metal profiles which are adjacent to one another and thermally joining the end portions thereof.

The calibration itself is carried out with an inner tool and an outer tool. For this purpose, the inner tool is introduced at least in the end region into the lightweight metal profile in the longitudinal direction. The outer tool is then guided up laterally and/or from above or below, in the form of a pressing tool, with the result that the cross section is plastically deformed and/or shaped.

The chamfer can likewise be formed during the shaping by shaping and/or by stamping. As an alternative, the chamfer can be produced by a machining operation. As an alternative, the chamfer may also be conjointly produced already during the extrusion.

The calibrated surface is then a joining region. This is a welding surface, but may also be an adhesive surface, for example on a side wall. The joining region is then arranged in a manner butt-jointed with an adjacent lightweight metal profile and joined.

The calibrated region can be plastically deformed outwardly or inwardly, with the result that a tapered profile cross section is present in cross section, for example. Depending on the actual dimension produced of the lightweight metal profile the end region can be widened.

In the context of the disclosure, a longitudinal portion which is formed in a center region of the lightweight metal profile can be calibrated. This is necessary, for example, in order to attach a strut. In this case, however, work is not carried out with an inner tool as counterholding tool. The calibration thus takes place only with an outer tool.

BRIEF DESCRIPTION OF THE DRAWINGS

The following description relates to further features, characteristics and aspects of the present disclosure. Embodiments are described in greater detail below with reference to the figures. These serve for a simple understanding of the disclosure. In the figures:

FIG. 1 shows a battery carrier according to some embodiments of the disclosure in a perspective view, FIG. 2A and FIG. 2B two different known coupling options, FIG. 3 shows a calibration operation according to some embodiments of the disclosure in an end region of a lightweight metal profile, FIG. 4 shows the coupling of two adjacent lightweight metal profiles in a side view according to some embodiments of the disclosure, FIG. 7A, FIG. 7B, and FIG. 7C show different calibrations of an end region of a lightweight metal profile according to some embodiments of the disclosure, FIG. 13A and FIG. 13B show a cross-sectional view and a plan view of at least one embodiment according to FIG. 4 with a base and a cover and an integrated seal, and FIG. 14A and FIG. 14B show an alternative configuration variant to FIG. 13A and FIG. 13B.

DETAILED DISCLOSURE

Figure 5A:
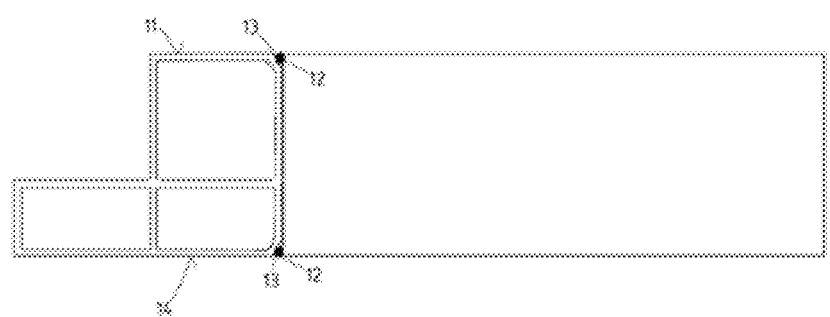
FIG. 5A and FIG. 5B show a side view and a plan view according to FIG. 4 with a chamfer.

The same reference signs are used in the figures for components which are identical or similar, although a repeated description is omitted for reasons of simplification.

FIG. 1 shows a battery carrier 1 according to the disclosure in a perspective view. The battery carrier 1 has a frame 2 running around on the outside. The frame 2 is formed from four lightweight metal profiles 3: a front one, a rear one and respective lateral lightweight metal profiles 3. Two transverse struts 4 extend between the lateral lightweight metal profiles 3. A longitudinal strut 5 extends from the front lightweight metal profile 3 to the rear one. Various receiving spaces for batteries, which are not illustrated in more detail, are thus shown inside the battery carrier 1. Shown running around on the outside are mechanical connectors 6, with which the battery carrier 1 can be fastened in a motor vehicle. The presence and the number of longitudinal strut(s) and/or the number of transverse struts are variable in the context of the disclosure and depend on the number of batteries to be received and the design, inter alia.

According to the disclosure, mounting points 7 are also provided on the top side, in order to couple a cover, which is not illustrated in more detail, to the battery carrier 1 and/or the trough of the battery carrier 1. Two lightweight metal profiles 3 which are adjacent to one another are coupled to one another in a respective end region 8, this being carried out by means of thermal joining. The transversely running lightweight metal profile 3, which is at the front with respect to the plane of the drawing, is coupled in a butting manner to the two lateral lightweight metal profiles 3. In order that an abutment of the side wall 9 of the lateral lightweight metal profile 3 and/or the end wall 10 of the front lightweight metal profile 3 is now made possible here, at least one, or both end regions 8 of the adjacent lightweight metal profiles 3 is/are calibrated.

Without the calibration, during the thermal joining malpositionings can occur, as shown in FIG. 2A and/or FIG. 2B. In this respect, the front side wall 9 is illustrated as a partial extension of the front lightweight metal profile 3 with a lateral lightweight metal profile 3. For example, as in FIG. 3A, an angular offset may arise in the end region 8 of the lateral lightweight metal profile 3. The side wall 9 of the lateral lightweight metal profile 3 is thus at an angle to the end wall 10 of the front lightweight metal profile 3, such that the position of the side wall 9 thus deviates from a vertical V. FIG. 2B shows a corresponding height offset. A top side 11 of the front lightweight metal profile 3 is arranged higher than the top side 11 of the side profile. If now a welding operation either according to FIG. 2A along the side wall 9 and/or a welding operation also on the top side 11 is carried out, a corresponding height offset is produced here that, when a cover, not illustrated in more detail, is being placed on are and also adversely affects a seal, lying in between, in the transition region.

In accordance with some embodiments, a corresponding lightweight metal profile 3 is calibrated in its end region 8, this being illustrated by the solid line. The dashed line serves to illustrate a delivery state, that is to say after the extrusion. During the calibration, in the longitudinal course of the lightweight metal profile 3 a plastic deformation of the end region 8 upwardly or downwardly and/or inwardly or outwardly may be performed here, with the result that a transition which is as seamless as possible is provided to an adjacent lightweight metal profile 3 when said profiles abut one another. An angular position of the right lightweight metal profile is compensated.

In the context of this disclosure as a whole, the end region 8 refers to a region which is formed as less than 20 percent of the overall length of the lightweight metal profile 3. The end region 8 relates to the region in which a further lightweight metal profile 3 is coupled in a butting manner.

According to FIG. 4, a high precision can therefore be produced in cross section. The outer lightweight metal profile 3 is illustrated here in cross section as an L-shaped three-chambered hollow profile, against which a front lightweight metal profile 3 then bears in a butting manner. In this respect, the side wall 9 and the end face 10 lie flush against one another or angular position or the like. A thermal joining seam 12, not illustrated in more detail, can thus be introduced precisely. A top and a bottom thermal joining seam 12 are also shown. However, the top thermal joining seam 12 would protrude according to a top side 11.

A cover, not illustrated in more detail, would thus be slightly raised in the region of the joining seam 12 in the top region. Additional measures can be undertaken, for example, using more sealant and/or machining the top joining seam 12 such that a substantially planar surface is formed.

Figure 5B:
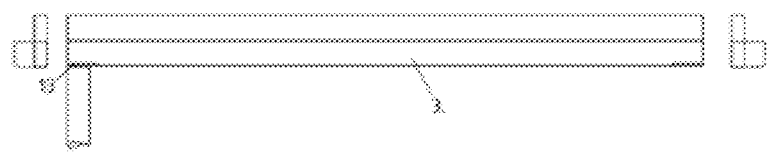

For this purpose, in at least one embodiment of the disclosure according to FIG. 5A and FIG. 5B a chamfer 13 is partially formed, or pressed in. The joining seam 12 is then arranged in this chamfer 13. According to the disclosure, the joining seam 12 is already offset inwardly, and/or offset downwardly as viewed from the top side 11. This results in the joining seam 12 no longer protruding, or protruding to a negligible extent, beyond the top side 11. When a seal or sealant is being applied for the purpose of mounting a cover, a corresponding cover can be mounted with only little reworking or without reworking.

Figures 6A, 6B:
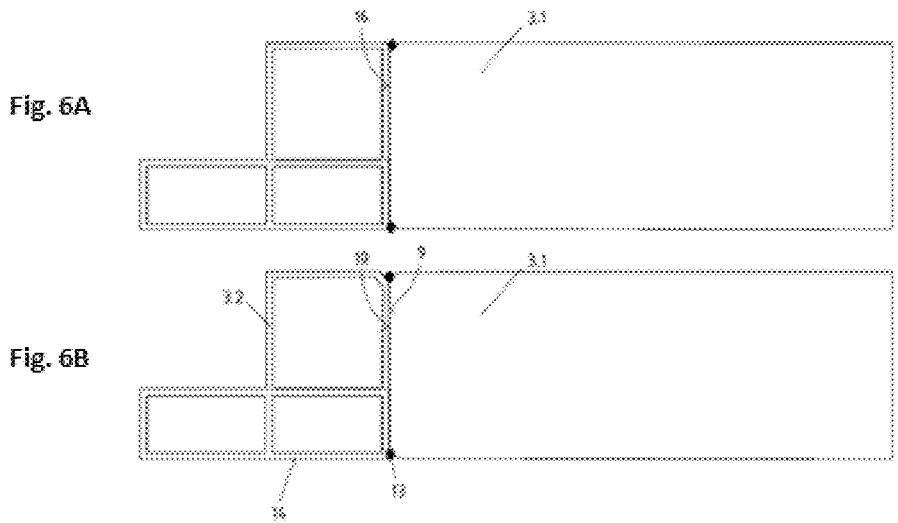
FIG. 6A and FIG. 6B show different embodiments according to the disclosure with a chamfer.

Here, the chamfer 13 is formed according to FIG. 5A and FIG. 5B in the end region 8 of the lightweight metal profile 3. The chamfer 13 is formed on a top side 11 and also on a bottom side 14. According to FIG. 6A and FIG. 6B, the chamfer 13 can also be formed on the end face 10 of the lightweight metal profile 3, as shown in FIG. 6A. Alternatively, according to FIG. 6B, both on the side wall 9 and on the end face of the respective lightweight metal profile 3. As shown on the bottom side in FIG. 6B, the chamfer 13 can be arranged on the end face of a profile only in the case in which a corresponding chamfer 13 is arranged on the top side 11, on the side wall 9 and on the end face 10 of the respective lightweight metal profile 3 for the purpose of receiving a corresponding thermal joining seam 12.

FIG. 7A, FIG. 7B, and FIG. 7C show a respective side and cross-sectional view of a lightweight metal profile 3. In FIG. 7A, a top side 11 has been calibrated in the end portion by shaping the top side 11 upward. In that case, a corresponding transition region 15 can be formed here in a linearly sloping manner. In the case of an abutting coupling, this region therefore does not make a step shoulder as illustrated in FIG. 2. In the cross section according to FIG. 7A, the embossed portion is configured in an upward manner only partially in one region in accordance with the solid line. According to FIG. 7B, the embossed portion is made in an upward manner almost over the entire width of the cross section. According to FIG. 7C, the top side 11 of an end portion has been pressed flatter, with the result that the cross section is reduced. In terms of a possible support surface for a cover which is to be placed on, a step shoulder would be present on the transition 15 to a further profile, not illustrated in more detail. In the examples according to FIG. 7A, FIG. 7B, and FIG. 7C, the chamfers are not shown, but may additionally be formed for example as in FIG. 6.

Figure 8:
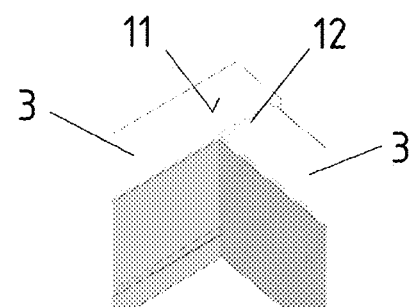
FIG. 8 shows an end region of two adjacent lightweight metal profiles in a plan view according to some embodiments of the disclosure.

According to FIG. 8, a correspondingly thermal joining seam 12 can thus be formed on the top side 11 of two adjacent lightweight metal profiles 3 without protruding beyond the top side 11. The result is therefore a substantially continuous surface for supporting a cover, not illustrated in more detail. The same applies here for the bottom side. The chamfer 13 is formed only in the end region 8 as a local embossing. As an alternative, in the context of the disclosure, the chamfer 13 may also be coextruded continuously when the starting profile is being produced, instead of the only local stamped indentation.

Figure 10:
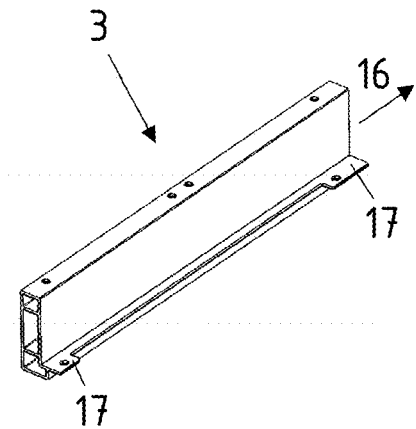
FIG. 10 shows an alternative configuration variant of a lightweight metal profile in a perspective view according to some embodiments of the disclosure.
Figure 9:
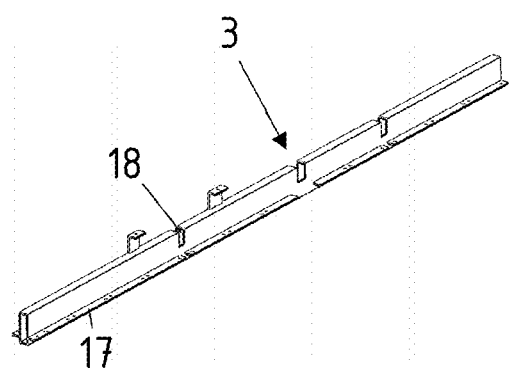
FIG. 9 shows a lightweight metal profile in a perspective view according to some embodiments of the disclosure.

According to FIG. 9 to FIG. 10, the lightweight metal profiles 3 may have further joining flanges or cutouts in the longitudinal course 16 thereof. The center region 18 can be calibrated, such as in FIG. 9. In that case, this center region is calibrated only from the outside, but in terms of its position, for e.g. center struts which are to be placed on or the like, is provided in a correspondingly geometrically precise manner, with the result that welding is possible.

Figure 11:
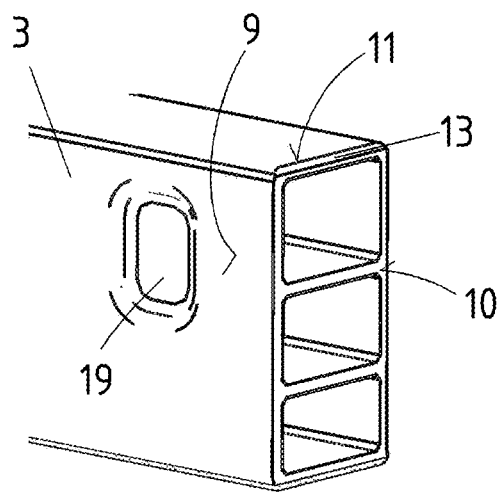
FIG. 11 shows an end region of a lightweight metal profile in an end view according to some embodiments of the disclosure.

FIG. 11 shows an end region or an end face 10 in the form of a corresponding lightweight metal profile 3. Here, the chamfer 13 is formed only in the region of the end face 10. In addition, a further stamped indentation has been made in the side wall 9. This stamped indentation may for example also be introduced during the calibration process, for example for the purpose of securing internal reinforcements or other insert components in the lightweight metal profile 3.

Figure 12:
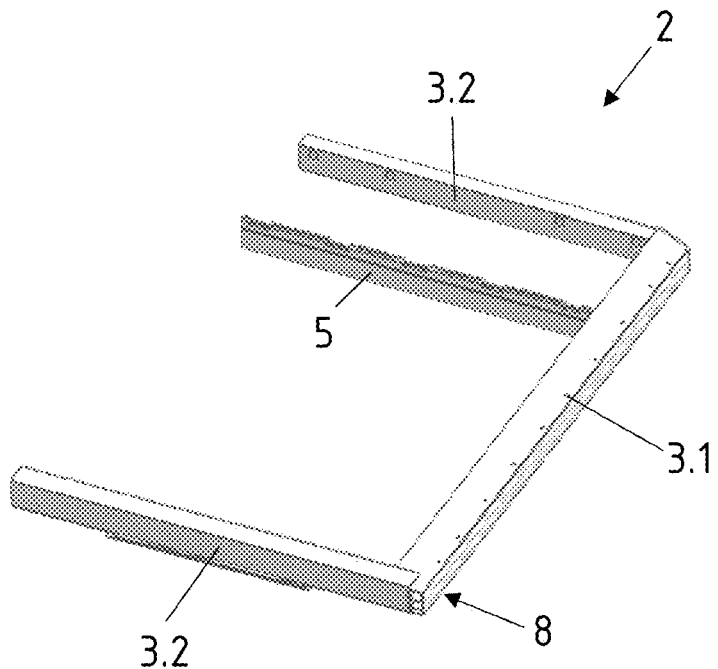
FIG. 12 shows a perspective view of a frame according to some embodiments of the disclosure.

FIG. 12 shows an arrangement for producing a frame for a battery carrier 1. In this case, a front lightweight metal profile 3 is provided. A longitudinal strut 5 and two lateral lightweight metal profiles 3 are inserted in the lightweight metal profile 3. For this purpose, an end region 8 of the front lightweight metal profile 3 is notched with a rectangular cross section, with the result that the front lateral lightweight metal profile 3 is inserted in this end region 8. A corresponding calibration can be carried out, which then allows a thermal joining, not illustrated in more detail.

FIG. 13A and FIG. 13B show a longitudinal sectional view and a plan view analogous to FIG. 4. A cover 20 is placed on the top side 11. A base 21 is placed on the bottom side 14. Integrated in each case is a seal 19, for example in the form of a sealing strip or else a sealing compound. Joining seam 12 recessed in the chamfer 13 is substantially no reworking necessary after the peripheral frame has been coupled. The base 21 and cover 20 can be placed on and abut the top side 11 or the bottom side 14, in an almost planar manner with insertion of the seal 19, with the result that sufficient precision with respect to the sealing of the battery case or battery carrier 1 is ensured even during mass production. The base layer itself could also be welded in a tight manner, for example. FIG. 13B shows a plan view. Here, a respective screwed connection 24 is illustrated, so that the cover 20 can be placed on as per the plan view, for example.

FIG. 14A and FIG. 14B show an embodiment analogous to FIG. 13A and FIG. 13B. A cooling base is formed as an addition to FIG. 13A and FIG. 13B. The base 21 is in the form of a base plate. Placed thereon is a lamellar plate 22 with crimped portions and/or embossed portions. As a result, cooling channels 23 are formed between the base 21 and the lamellar plate 22. The lamellar plate 22 and the base plate can be soldered or else welded in a tight manner, with the result that a double-plate layer with attendant channels is formed.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A battery carrier for an electric vehicle, comprising: a trough having a frame and a plurality of struts, the plurality of struts extending across the frame, wherein
    the frame and the plurality of struts comprise a plurality of hollow profiles, the plurality of hollow profiles joined to one another by material bonding,
    at least one hollow profile of the plurality of hollow profiles is geometrically calibrated at one end portion of the at least one hollow profile,
    the one end portion has a chamfer, and
    the chamfer has a thermal joining seam arranged therein.

2. The battery carrier according to claim 1, wherein
    the at least one hollow profile bears against an adjacent hollow profile among the plurality of hollow profiles, and
    the thermal joining seam joins the at least one hollow profile with the adjacent hollow profile, and is arranged in a recessed manner in the chamfer.

3. The battery carrier according to claim 1, wherein the at least one hollow profile comprises a side wall, and the side wall is deformed in the one end portion.

4. The battery carrier according to claim 1, wherein the at least one hollow profile comprises a top wall and a bottom wall, and the top wall and the bottom wall are deformed in the one end portion.

5. The battery carrier according to claim 1, wherein, at the one end portion, an orientation of a side wall of the at least one hollow profile with respect to a vertical direction of the frame is different in relation to the orientation of the side wall in a longitudinal portion adjoining the one end portion, due to the one end portion being geometrically calibrated.

6. The battery carrier according to claim 1, wherein the at least one hollow profile has a cutout, and an adjacent hollow profile among the plurality of hollow profiles is inserted in the cutout.

7. The battery carrier according to claim 2, wherein the at least one hollow profile and the adjacent hollow profile have cross sections that differ from one another.

8. The battery carrier according to claim 1, wherein the chamfer is on an end edge of the one end portion.

9. The battery carrier according to claim 1, wherein the chamfer is on an outer longitudinal edge of the one end portion.

10. The battery carrier according to claim 1, wherein the plurality of hollow profiles comprises extruded hollow profiles.

11. The battery carrier according to claim 10, wherein the extruded hollow profiles comprise extruded lightweight metal profiles.

12. A method of making the battery carrier according to claim 1, the method comprising:

extruding the plurality of hollow profiles;

calibrating the one end portion of the at least one hollow profile of the plurality of hollow profiles by plastic shaping;

creating the chamfer (i) during the extruding before the calibrating, or (ii) during the calibrating;

arranging the one end portion of the at least one hollow profile adjacent to a further hollow profile among the plurality of hollow profiles; and thermally joining the one end portion of the at least one hollow profile to the further hollow profile by the thermal joining seam which is arranged in the chamfer.

13. The method according to claim 12, wherein the calibrating is performed with an inner tool and an outer tool, and comprises introducing the inner tool into the at least one hollow profile in a longitudinal direction of the at least one hollow profile.

\* \* \* \* \*